United States Patent [19]

Pohl

[11] Patent Number: 4,604,520
[45] Date of Patent: Aug. 5, 1986

[54] OPTICAL NEAR-FIELD SCANNING MICROSCOPE

[75] Inventor: Wolfgang D. Pohl, Adliswil, Switzerland

[73] Assignee: International Business Machines Corporation, Armonk, N.Y.

[21] Appl. No.: 563,722

[22] Filed: Dec. 20, 1983

[30] Foreign Application Priority Data

Dec. 27, 1982 [EP] European Pat. Off. ........ 82111974.0

[51] Int. Cl.⁴ .............................................. H01J 3/14
[52] U.S. Cl. .................................... 250/216; 350/319
[58] Field of Search ............... 350/319, 507, 521, 534; 250/216, 239, 234

[56] References Cited

U.S. PATENT DOCUMENTS 3,558,814  1/1971  Engle .................................. 250/216
4,070,090  1/1978  Farr et al. ............................ 350/507
4,469,411  9/1984  Clegg .................................. 350/507

Primary Examiner—David C. Nelms
Attorney, Agent, or Firm—Jackson E. Stanland

[57] ABSTRACT

This optical near-field scanning microscope comprises an "objective" (aperture) attached to the conventional vertical adjustment appliance and consisting of an optically transparent crystal having a metal coating with an aperture at its tip with a diameter of less than one wavelength of the light used for illuminating the object. Connected to the aperture-far end of the "objective" is a photodetector via an optical filter and an optical fiber glass cable. Scanning the object is done by appropriately moving the support along x/y-coordinates. The resolution obtainable with this microscope is about 10 times that of state-of-the-art microscopes.

9 Claims, 5 Drawing Figures

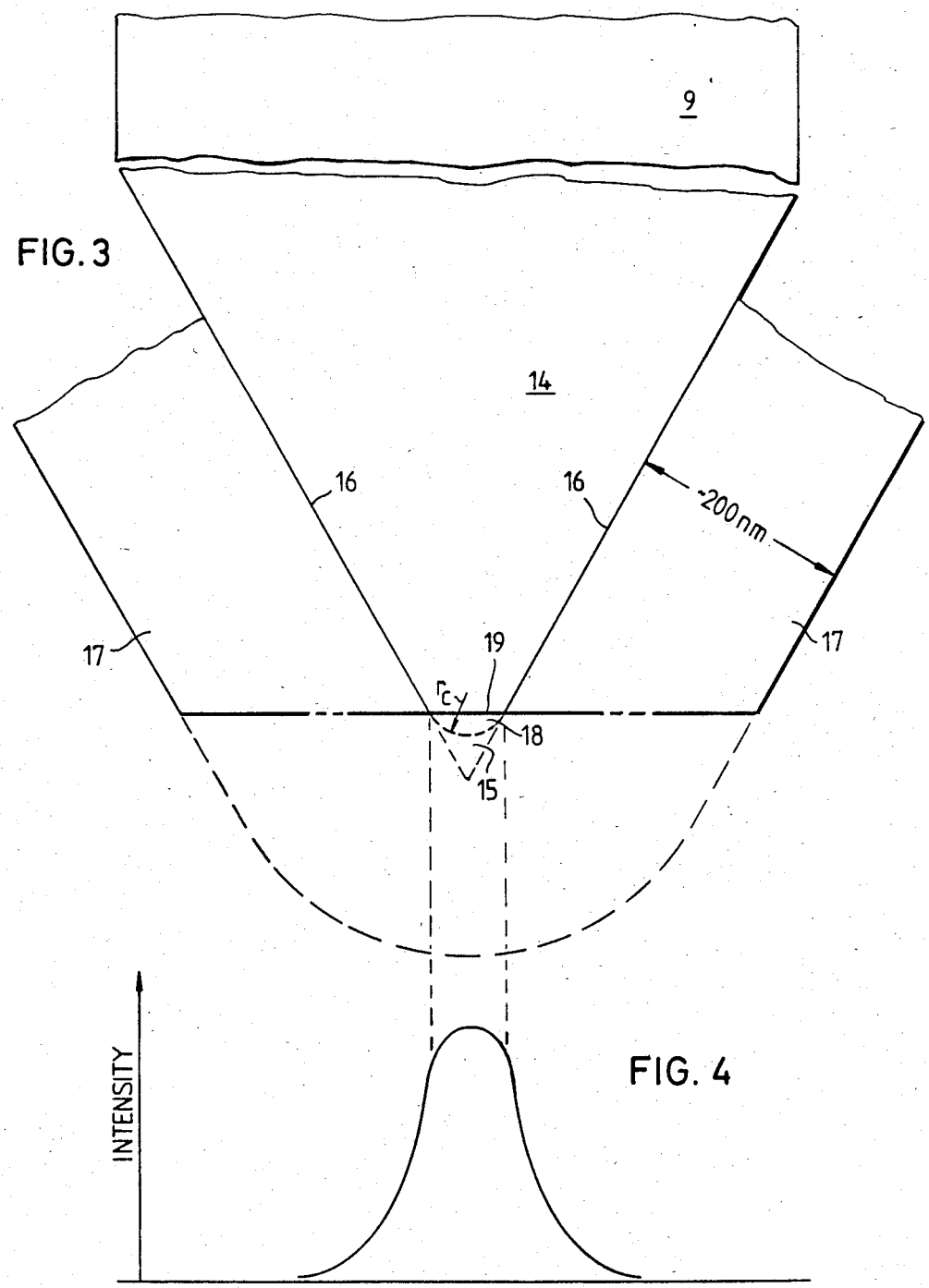

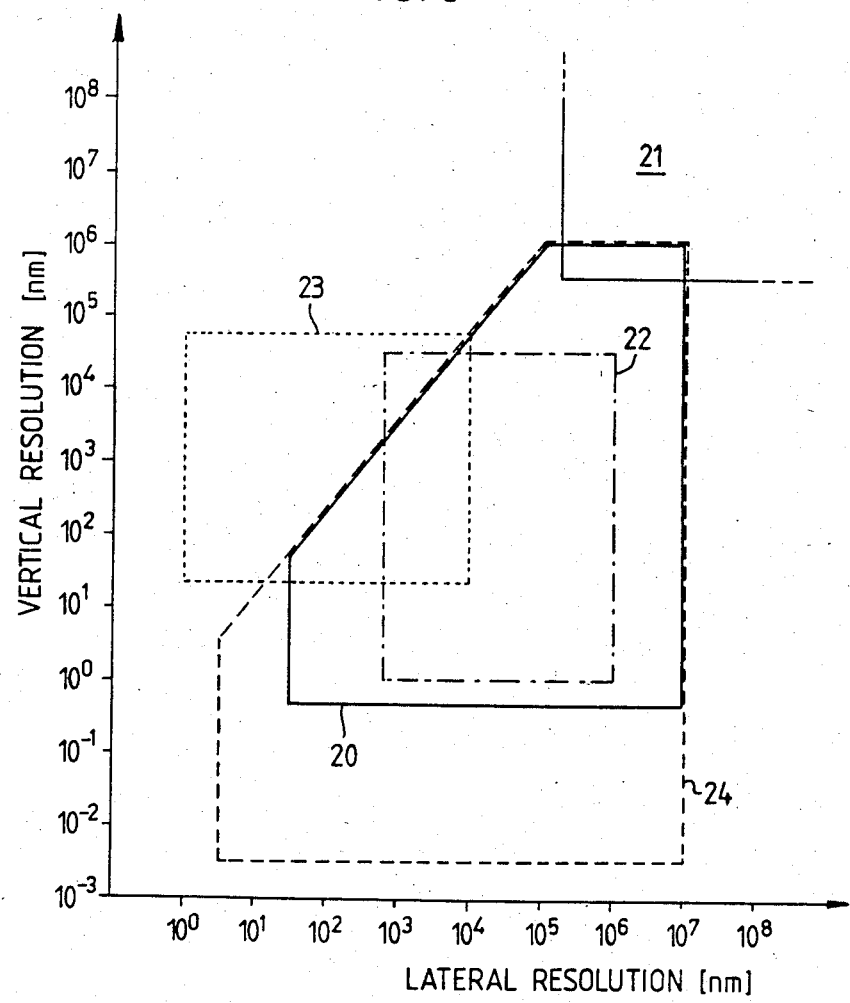

OPTICAL NEAR-FIELD SCANNING MICROSCOPE

TECHNICAL FIELD

This invention relates to optical microscopes in which an aperture is scanned across an object to be inspected, and more particularly to such a microscope with improved resolution wherein the light quanta received are processed electronically to improve the resolution power and depth of focus.

The term "near-field" is intended to express the fact that the aperture is located near the object at a distance smaller than the wavelength of the light. The term "aperture" is used here to describe the pointed end of a light waveguide which forms an entrance pupil with a diameter of less than 1 $\mu$m.

BACKGROUND ART

Conventional scanning microscopes comprise essentially a focusing means to focus radiation from a light source onto an object to be inspected, a radiation detector, and scanning means to cause relative movement between the point of focus and the object.

The ultimate limit of resolution of state of the art optical devices, such as microscopes, is of the order of one wavelength, i.e., about 500 nm. Two neighboring object points are considered to be just resolved if in the image the principal diffraction maximum of the first object point coincides with the first diffraction minimum of the second object point (Lord Rayleigh, Phil. Mag. (5), 8(1879) 261).

The distance Y between two object points which an optical microscope can just resolve, when the illumination is incoherent and the microscope's aperture is circular, is $\sim 0.61\lambda/n \cdot \sin\theta$, wherein the term $n \cdot \sin\theta$ is the "numerical aperture", i.e. the product of the refractive index n and the size of the semi-angle $\theta$ of the cone of rays in the object space. The numerical aperture should be large if a high resolving power is to be achieved (M. Born and E. Wolf, Principles of Optics, Pergamon Press, London 1959, p. 417(f). Considering that the largest numerical apertures so far achievable are about 1.3 ... 1.4, the best resolution is of the order of 0.5$\lambda$.

The above-mentioned resolution limit is derived under the assumption that the optical instrument is based on imaging and implies that both the diameter 2a of the entrance pupil of the objective and its distance h from the object are large compared to the wavelength $\lambda$ of the illumination used (a, h$>>\lambda$). Because of the shortness of the wavelengths present in visible light compared with the smallest diameter to which an entrance pupil could be manufactured hitherto, this condition is satisfied in conventional optical instruments in a natural way.

Numerous attempts to increase the resolving power of microscopes are known from the prior art. In U.S. Pat. No. 3,926,500 a diaphragm having small openings is rotated in a plane conjugate to the object plane. The object to be inspected is illuminated through the diaphragm such that light passing through its openings is sharply focussed only on areas lying in or near to the object plane within the depth of focus range of the objective. Accordingly, only light reflected from said areas can contribute to the formation of a clear image. When either the object or the diaphragm are cyclically shifted in the direction of the optical axis, the depth of focus of the microscope can be somewhat extended, with the disadvantage, however, that the actual roughness of the surface inspected is equalled out.

According to the literature reference "Optische Abbildung unter Ueberschreitung der beugungsbedington Auflosungsgrenze" by W. Lukosz and M. Marchand, Optics Acta 10 (1963) p. 241, the resolution of the optical system can be increased by a grid-like arrangement of the scanning diaphragm pinholes.

U.S. Pat. No. 4,198,571 describes the improvement of the resolution of scanning microscopes through the use of an annular lens, which may be a circular lens with a closely spaced annular aperture. A disadvantage with such an arrangement is the severe loss of power through the annulus which requires the use of a sufficiently powerful source of coherent light, such as a laser.

The references cited clearly indicate that efforts have been made to increase resolution by pushing the natural limitation given by the dimensions of the optical elements, particularly lenses, used in optical microscopes. None of the references proposes a microscope having only a submicron optical aperture without imaging elements.

The present invention is an optical microscope which circumvents the above-described resolution limit through the use of an aperture with an entrance pupil diameter 2a and a distance h from the object which are small compared to the wavelength of the light. The aperture receives a signal, the intensity of which depends on the transmissivity of a spot on the illuminated object directly opposite its entrance pupil. When scanned along the surface, the intensity varies according to the objective transmissivity. The record of the scan represents an "image" of the object. The resolution of the "image" can be substantially below the classical resolution limit, say $\lambda/10$.

A key element of such an optical microscope is, of course, the aperture, and the following specification will in part be devoted to a description of an aperture manufactured from the a pyramid-shaped transparent crystal, the apex of which has been machined to yield a radius of curvature equal to or less than the desired resolution.

A pyramid-shaped lens is known from the article "Self-Image and Enlarging Lens" by T. S. Fitzgerald in IBM Technical Disclosure Bulletin, Vol. 18 (1976), p. 4174. This lens is used for enlarging an image recorded on photographic film (e.g. microfiche) and for displaying it on its frosted base surface. A lens as disclosed in this reference, apart from having macroscopic dimensions, cannot be used in a microscope application as more is needed than just cutting the apex: provision must be made to precisely delineate the borders of the aperture, a measurement not required in the macroscopic application shown in the reference.

Accordingly, it is a primary object of the present invention to provide a new optical microscope having improved resolution.

It is another object of the present invention to provide a scanning optical microscope having an improved optical aperture.

It is a further object of the present invention to provide a scanning optical microscope having an aperture with an entrance pupil of submicron dimensions.

It is a still further object of this invention to provide a scanning optical microscope whose resolution limit can be less than the classical resolution limit of the wavelength of the light used in the microscope.

DISCLOSURE OF THE INVENTION

The invention accordingly relates to an optical near-field scanning microscope comprising an aperture with arrangements for mutual scanning displacement between the aperture and the object to be viewed at a controllable distance therebetween, a photodetector optically connected to said aperture, and a light source. The characteristics of this microscope reside in the fact that the aperture consists of a transparent body covered with an opaque layer into which an opening is formed, the diameter of which is small compared to the wavelength of the light used for illuminating the object to be viewed. Also, the distance from the aperture to the object is small compared to the wavelength of the light.

In a preferred embodiment, the microscope comprises a photodetector with an optical filter arranged between the aperture and said photodetector. In another embodiment, the light source is arranged to illuminate the specimen through the aperture while the transmitted or reflected light is collected by a sensor outside the aperture.

These and other objects, features and advantages will be apparent from the following more particular description of the preferred embodiments.

BRIEF DESCRIPTION OF THE DRAWINGS

Details of embodiments of the invention will be explained by way of example in the following description and with reference to the drawings in which:

FIG. 3 is a grossly enlarged view of the aperture used in the microscopes of FIGS. 1 and 2.

FIG. 4 is a diagram showing schematically the intensity decrease of the light passing the opaque layer of the aperture of FIG. 3.

FIG. 5 is a diagram comparing the resolutions of various types of microscopes.

BEST MODE FOR CARRYING OUT THE INVENTION

Figure 1:
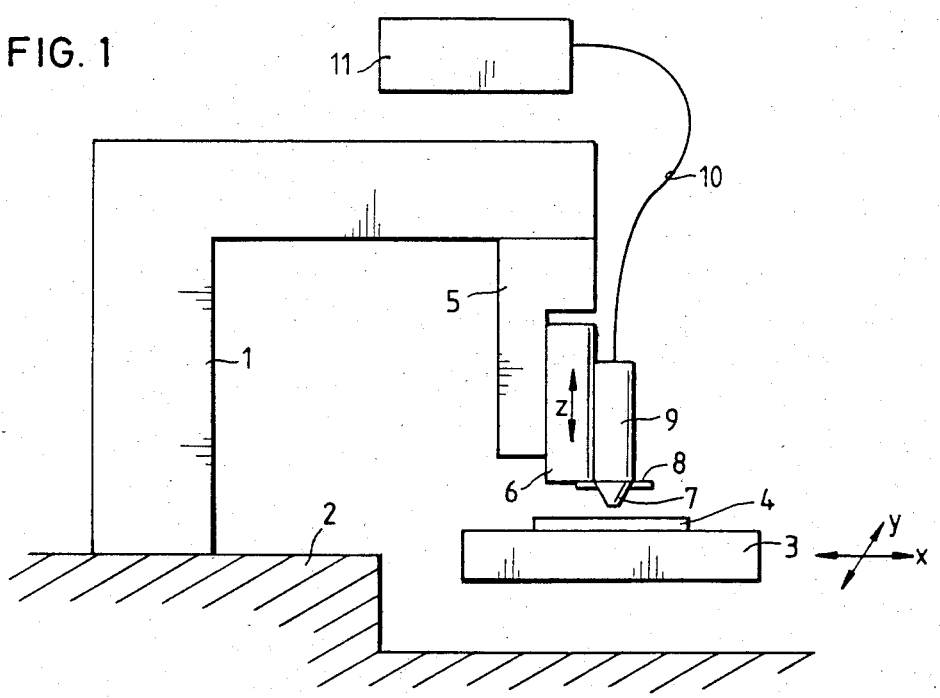
FIG. 1 illustrates one embodiment of the scanning microscope in accordance with the invention.

FIG. 1 shows the general disposition in a first embodiment of the elements of a near-field optical scanning microscope in accordance with the present invention. For purposes of explanation all elements have been drawn without regard to their actual proportions. A frame 1 is secured to a bench 2 which in a conventional fashion also carries a support 3 arranged for x/y-movement by conventional means not shown. Support 3, which may be transparent and transilluminated from below, carries the object 4 to be inspected. Frame 1 has an arm 5 extending therefrom and carrying a vertical adjustment appliance 6 for adjusting the distance of an aperture 7 from object 4, the distance being controlled by means of a sensor 8 and conventional adjustment means not shown. Attached to aperture 7 is an optical filter 9 which in turn is connected via a light guide 10 to a photodetector 11 which may comprise a photomultiplier or the like. Filter 9 is not essential but helps to discriminate against unwanted radiation.

Scanning displacement between aperture 7 and the object 4 to be viewed may easily be achieved by moving support 3 with respect to bench 2 and, hence, aperture 7, with the aid of piezo-electric translators known to elongate or contract in response to appropriate voltages applied to electrodes attached to opposite surfaces thereof. Since the elongations/contractions of these crystals are proportional to the potential applied, reproducible displacements smaller than micrometers can be achieved.

The vertical adjustment of the aperture is preferably divided into conventional coarse and fine adjustments, whereby the coarse adjustment may be made by means of rack-and-pinion assembly, whereas for fine adjustment another piezo-electric translator may be used.

When scanned along the surface, the light transmitted from the object through the aperture varies in accordance with the light intensity transmitted by the object. The resolution to be achieved is approximately $h+a$. The distance $h$ favorably is $\leq 2a$, hence $2 \times 20$ nm $\cong \lambda/10$.

Figure 2:
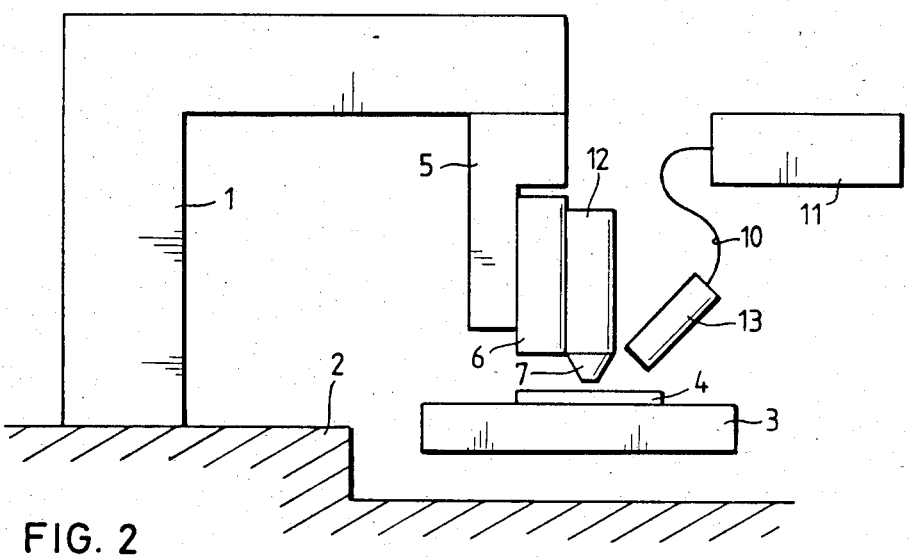
FIG. 2 illustrates another, "inverse" embodiment of the scanning microscope.

In an alternative embodiment which may be regarded as an inversion of the first embodiment just described, and which is shown in FIG. 2, (wherein the same reference numerals are used for functionally similar emements) illumination of the object 4 to be inspected is provided through the aperture 7 which may be associated with or integrated into an appropriate light source 12 which may comprise, e.g. a semiconductor laser known in the art. Light reflected from object 4 is detected by one or more sensors 13 arranged in juxtaposition to object 4. Obviously, this inverted configuration has similar properties as the first described embodiment but may be more advantageous under certain circumstances. In particular, the intensity of light at the object can be considerably lower in this case.

Alternatively, the inverted arrangement can be used in transmission by placing a detector under the sample.

As mentioned before, the critical element of the microscope in accordance with the present invention is the aperture 7. FIG. 3 shows the lower end of optical filter 9 to which a pyramid-shaped transparent crystal 14 is connected. Optical filter 9 may, e.g., have a cross section of about $200 \times 200$ μm, while crystal 14 is selected to have a very sharp apex 15 formed by the facets 16 thereof with a radius of curvature $r_c$ equal to, or less than, the desired resolution, which for the purposes of explanation is assumed to be in the 20 nm range.

Crystal 14 has a metal coating 17 (not drawn to scale) with a typical thickness of about 200 nm. This is considered thick enough to be practically opaque. At the apex 15 the tip 18 of the crystal 14 and the metal film 17 are removed (e.g. by ion milling) so as to expose crystal 14 over an essentially square area 19 having a side length a of less than 100 nm, for example 20 nm. Area 19 is transparent to light and is used as the entrance pupil of the microscope. Very close to area 19, metal coating 17 is thinner than 200 nm in the direction of the optical axis and thus will have some transmissivity which will, however, quickly decrease with distance from the optical axis as schematically shown in the diagram of FIG. 4. The penetration depth of light into metal being approximately 12 nm for a reasonably good reflector (like Al), the effective aperture will be slightly larger than $a^2$. During the fabrication of the aperture, the transmission of light is monitored so that the ion milling (or other) process is stopped when the entrance pupil has reached the desired size.

An alternative to the aperture produced from a crystal is one made of an optical glass fiber. A monomode glass fiber consists of a core with a diameter on the order of magnitude of the wavelength of the light to be transmitted, and a cladding surrounding the core and having a lower refractive index than the core, such that total reflection can occur within the latter. For the purposes of the microscope under description, a glass fiber may be coated at one plane end with an opaque coating, such as metal, and a coaxial hole drilled into the coating (e.g. with an electron beam) so as to just expose the core. With an optical fiber prepared as described above an aperture is obtained which has essentially the same characteristics as an aperture produced from a pyramid-shaped crystal.

Although small with respect to the wavelength λ, the entrance pupil has a finite transmission. A semiquantitative estimate is possible from the theory of Mie Scattering in combination with Babinet's theorem, according to which the transmission is approximately equal to the reflection of a conducting sphere. The transmissivity of an opening with radius a (a<λ) is $T_a = 4/3 \cdot (2\pi a/\lambda)^4$ and the "transmission cross section" is $Q_a = a^2 \pi \cdot T_a$. Assuming a radius of 20 nm and a wavelength λ of 500 nm, $T_a \sim 0.5\%$ and $Q_a \sim 6.7 \cdot 10^{-14}$ cm². The flux through the aperture is $\phi_a = Q_a I^{(i)}$ and is $\phi_a = 6 \cdot 10^{-13}$W, if a rather conservative value of $\phi = 10 W/cm^2$ for the incident radiation is employed. This corresponds to $2 \cdot 10^6$ photons/s which is an easily detectable amount for present-day photo/second multipliers. In view of the $a^6$-proportionality of the transmission cross section $Q_a$, halving the radius a would lead to a flux of $3 \cdot 10^3$ photons/second only.

In view of the possible roughness of the object surface, the distance of the aperture from the surface has to be monitored with high resolution. Various techniques may be used for this purpose:

(1) Mechanical scanning with a conventional "Talystep" apparatus having a height resolution of ~5 nm.
(2) Differential interference contrast microscopy (Nomarski method) with a <1 nm resolution.
(3) Frustrated total internal reflection: An evanescent wave decays exponentially in the space above the object, providing a sensitive measure of distance from the object surface. The sensor could be either the aperture itself or a separate, preferably larger sensing element.
(4) Measurement of the capacitance between the aperture (metallized surface) and the object or the support.

With working distances in the 10 ... 50 nm range, a resolution of ~1 nm is possible. While technique (1) above is considered marginal, techniques (2) and (4) will certainly, and technique (3) will probably provide the required resolution.

Mutual displacement along x/y-coordinates between object 4 and aperture 7 can be achieved e.g. by moving support 3 in a stepwise fashion. A useful travelling support is described in European Patent Publication No. 71 666, published 2/6/83, (Patent Application No. 81 106 229.8) "Electric Travelling Support which Permits Displacements in the Nanometer Range" (This is U.S. counterpart application Ser. No. 406,653, filed 8/9/82).

A comparison of the scanning near-field optical microscope according to the present invention with conventional microscopes shows that it exceeds optical microscopes by a factor of 5 or better in resolution, but does not achieve the resolution of electron microscopes. In favorable contrast to these microscopes, it can be operated in air or liquids like conventional optical instruments. It also provides optical spectral information. Accordingly, the microscope of the present invention is well suited for application in the following fields: Microelectronics, surface sciences, thin film technology, biology, etc.

In FIG. 5, the lateral and vertical resolution of the scanning near-field optical microscope (20) is compared with that of the human eye (21), conventional optical microscopes (22), electron microscopes (23) and the recently developed scanning tunneling microscope (24) as disclosed in U.S. Pat. No. 4,343,993.

While the present invention has been described with respect to preferred embodiments thereof, it will be understood by those of skill in the art that variations can be made therein, without departing from the spirit and scope of the invention.

What I claim as new and desire to secure by Letters Patent is:

1. An optical near-field scanning microscope comprising an aperture with arrangements for mutual scanning displacement between said aperture and an object to be viewed to provide a controllable distance therebetween, a photodetector optically connected to said aperture, and a light source, characterized in that said aperture consists of a transparent body covered with an opaque layer through which an opening is formed, the diameter of said opening being less than the wavelength of the light used for illuminating the object to be viewed.

2. The microscope of claim 1, wherein said transparent body includes a pyramid-shaped transparent crystal having triangular facets covered with said opaque layer which at the apex of said crystal has been removed so as to form a pupil having a side length of ≈500 nm of said crystal.

3. The microscope of claim 1, wherein said transparent body includes an optical glass fiber having a cladding thereon, the cladding at the tip of said fiber being partially replaced by said opaque coating having a hole therein of between 10 and 500 nm diameter, said hole being centered with the axis of the core of said glass fiber.

4. The microscope of any one of claims 1 through 3, wherein said aperture is mounted on a holder for mutual displacement with respect to said object at increments of distance smaller than the optical wavelength of the light illuminating the object.

5. In an optical near-field scanning microscope for viewing an object including a light source and an aperture having an entrance pupil therein and means for providing displacement between said aperture and said object to provide a controllable distance therebetween, the improvement wherein said aperture includes a pupil through which light can pass, the effective diameter of said pupil being less than the wavelength of the light used to illuminate said object.

6. The microscope of claim 5, wherein the distance between said aperture and said object is less than the wavelength of said light.

7. The microscope of claim 5, wherein said aperture is a light transparent body having a substantially light-opaque coating on a surface thereof, said pupil being an opening in said coating through which said light can pass.

8. The microscope of claim 7, where said transparent body includes a pyramid-shaped transparent crystal.

9. The microscope of claim 7, where said transparent body is an optical glass fiber.

* * * * *